Patented May 20, 1930

1,759,272

UNITED STATES PATENT OFFICE

PAUL NAWIASKY, OF LUDWIGSHAFEN-ON-THE-RHINE, GERMANY, ASSIGNOR, BY MESNE ASSIGNMENTS, TO GENERAL ANILINE WORKS, INC., OF NEW YORK, N. Y., A CORPORATION OF DELAWARE

ACYL-AMINO-DIBENZANTHRONES AND PRODUCTS RESULTING THEREFROM BY TREATMENT WITH ALKYLATING AGENTS

No Drawing. Application filed July 10, 1925, Serial No. 42,825, and in Germany August 11, 1924.

I have found that when acting on amino derivatives of the dibenzanthrone series (which term comprises amino derivatives of dibenzanthrone and isodibenzanthrone, which may also be otherwise substituted), with acylating agents in the presence of at least such an amount of an inert organic solvent or diluent that the resulting mixture can be stirred when warm, products are formed, distinctly differing from the known products obtained in the absence of diluents (see U. S. Patent 1,128,836). For example, when amino-dibenzanthrone is boiled with benzoyl chlorid, a violet red dye is produced, while in the presence of a diluent a blue dyestuff results.

The dyestuffs produced in accordance with my present invention are distinguished by valuable properties which can be considerably improved by subsequently alkylating the products. Both the brilliancy of the dyeings produced with the aid of these dyestuffs and especially their fastness to chlorine are considerably enhanced thereby.

The following examples will serve to illustrate further the manner of carrying this invention into practice but the invention is not confined to these examples. The parts are by weight.

Example 1

50 parts of pure amino-dibenzanthrone, obtained by reducing the nitro-dibenzanthrone obtained in accordance with U. S. Patent 1,513,851, are introduced into a mixture of 50 parts of benzoyl chlorid and 1000 parts of nitro-benzene. The mixture is heated to boiling and stirred at boiling temperature for 3 hours. On cooling, the dyestuff, corresponding to the following formula

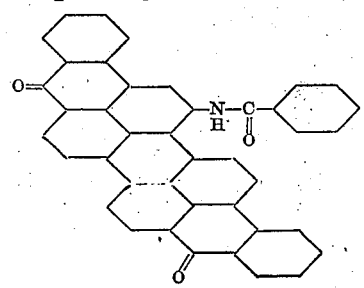

separates out as a dark powder which is difficultly soluble, for example, in trichlorobenzene with a blue color and a red fluorescence. In concentrated sulfuric acid it dissolves with a reddish violet coloration. The vat prepared with the dyestuff is reddish violet and dyes cotton, after exposure to the air, a deep blue. On chlorinating strongly the dyeing turns gray.

With o-chloro-benzoyl chlorid instead of benzoyl chlorid a similar dyestuff with a slightly more reddish tinge is obtained. Amino-iso-dibenzanthrone by the same treatment yields a beautiful violet dyestuff.

Example 2

4 parts of the dyestuff obtained as described in the foregoing Example 1 from o-chloro-benzoyl chlorid and amino-dibenzanthrone, are boiled with 16 parts of calcined sodium carbonate, 4 parts of toluene-p-sulfonic acid methyl ester and 100 parts of nitro-benzene, for several hours. When cool, the solution is filtered from a small amount of less pure dyestuff which has separated out, and the pure dyestuff contained in the filtrate is then freed from the solvent by distillation with steam. The new dyestuff probably corresponding to the following formula:

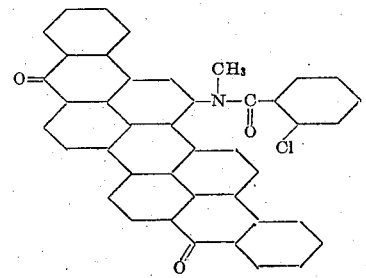

is a powder of metallic lustre, dissolving in sulfuric acid of 66 degrees Baumé with a reddish violet color, slightly more bluish than the starting material. In boiling trichlorobenzene it dissolves rather readily with a blue coloration and a red fluorescence. It dyes cotton from a pure blue vat deep navy blue shades of excellent fastness to chlorine.

With the product obtained from amino-dibenzanthrone and benzoyl chlorid a dyestuff of a lesser reddish tinge is obtained by the same treatment, and with the product obtained from o-chloro-benzoyl chlorid and amino-isodibenzanthrone a bright violet dyestuff of excellent fastness to chlorine.

With other alkylating agents, for example, ethyl-para-toluene-sulfonate, similar dyestuffs are obtained.

*Example 3*

100 parts of pure amino-dibenzanthrone are stirred for three hours, at 160 degrees centigrade, with 2000 parts of nitrobenzene and 100 parts of toluene-sulfochlorid. The dyestuff produced can be separated from the reaction mixture for example by distillation with steam and corresponds probably to the formula:

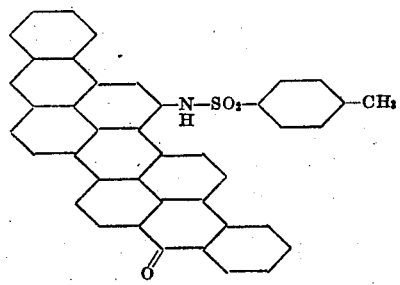

It forms a dark powder which is soluble reddish violet in concentrated sulfuric acid, and difficultly soluble in hot trichlorobenzene with a blue color and a red fluorescence. It dyes cotton from a reddish violet vat bluish green shades which on cholorinating turn bluish gray.

*Example 4*

50 parts of the dyestuff obtained according to Example 3 are boiled under a reflux cooler, for 3 hours, with 1000 parts of tri-chlorobenzene, 50 parts of toluene sulfonic acid methyl ester and 50 parts of calcined sodium carbonate. When cool, the reaction product is filtered off and freed from any adhering solvent and salts in a suitable manner. The new dyestuff, the constitution of which has not yet been ascertained, dyes cotton from a blue vat rather deep bluish gray shades which are practically fast to chlorine. By crystallization from trichlorobenzene wherein it dissolves with difficulty with a blue color and a red fluorescence, it can be obtained in nice little crystals. The solution of the pure product is crimson, its vat greenish blue, the dyeings obtained with it are deep greenish blue.

What I claim is:

1. The process of producing new vat dyestuffs of the dibenzanthrone series which comprises acting on an amino derivative of the dibenzanthrone series with an acylating agent in the presence of at least such an amount of an inert organic diluent that the resulting mixture can be stirred when warm.

2. The process of producing new vat dyestuffs of the dibenzanthrone series which comprises acting on an amino derivative of the dibenzanthrone series with an acylating agent in the presence of at least such an amount of an inert organic diluent that the resulting mixture can be stirred when warm and subsequently treating the product with an alkylating agent.

3. As new articles of manufacture acylated amino-dibenzanthrones which are obtainable by acting upon an amino derivative of a dibenzanthrone with an acylating agent in at least such an amount of an inert organic diluent that the resulting mixture can be stirred when warm, which products are dyestuffs not fast to chlorine and are altered by the action of alkylating agents.

4. As new articles of manufacture, alkyl-acyl-amino-dibenzanthrones containing both an alkyl and an acyl group bound to the same nitrogen atom.

In testimony whereof I have hereunto set my hand.

PAUL NAWIASKY.